Nov. 17, 1959
H. M. OGLE
2,913,596
MAGNETIC FREQUENCY CONVERTER
Filed Aug. 5, 1957
3 Sheets-Sheet 1
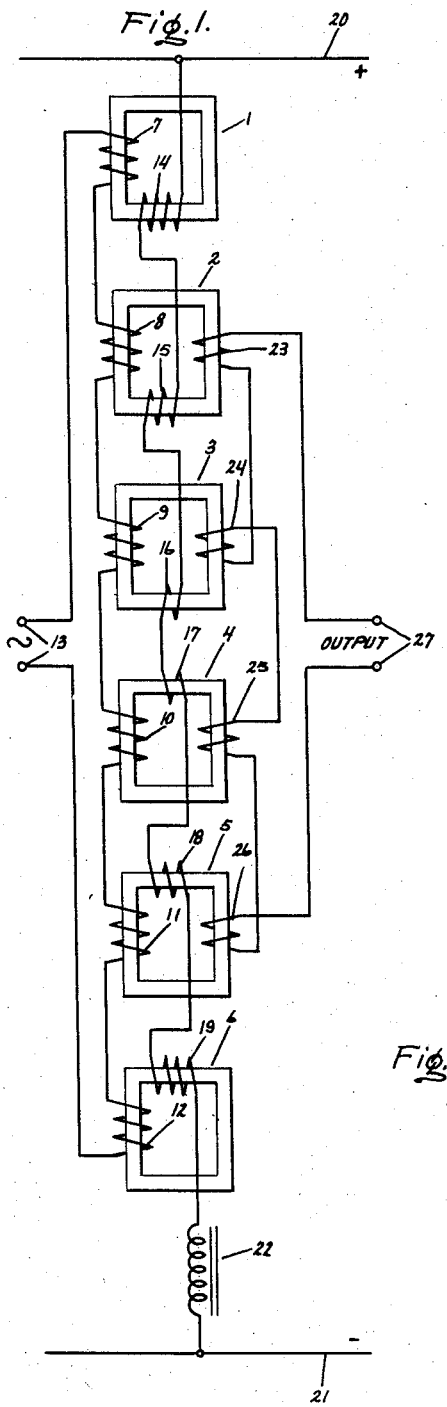
Fig. 1.
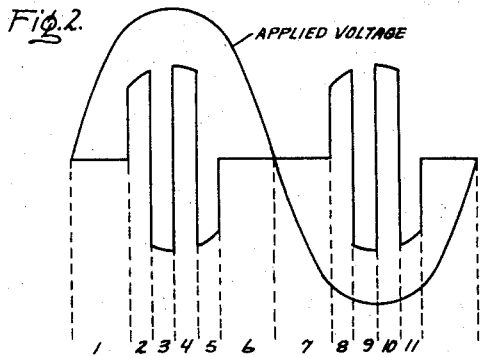
Fig. 2.
Fig. 3.
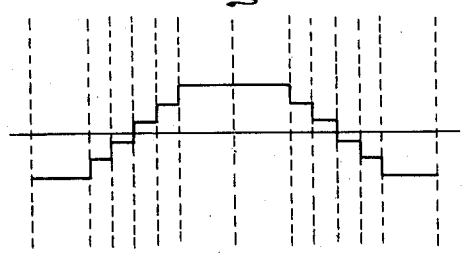
Fig. 4.
| | CORES | | | | | |
|---|---|---|---|---|---|---|
| | 1 | 2 | 3 | 4 | 5 | 6 |
| BIAS | +3 | +2 | +1 | -1 | -2 | -3 |
| 1 | U | S- | S- | S- | S- | S- |
| 2 | S+ | U | S- | S- | S- | S- |
| 3 | S+ | S+ | U | S- | S- | S- |
| 4 | S+ | S+ | S+ | U | S- | S- |
| 5 | S+ | S+ | S+ | S+ | U | S+ |
| 6 | S+ | S+ | S+ | S+ | S+ | U |
| 7 | S+ | S+ | S+ | S+ | S+ | U |
| 8 | S+ | S+ | S+ | S+ | U | S- |
| 9 | S+ | S+ | S+ | U | S- | S- |
| 10 | S+ | S+ | U | S- | S- | S- |
| 11 | S+ | U | S- | S- | S- | S- |
| 12 | U | S- | S- | S- | S- | S- |
TIME INTERVALS
Inventor:
Hugh M. Ogle,
by *Robert G. Irish*
His Attorney.

Nov. 17, 1959  H. M. OGLE  2,913,596
MAGNETIC FREQUENCY CONVERTER
Filed Aug. 5, 1957  3 Sheets-Sheet 2
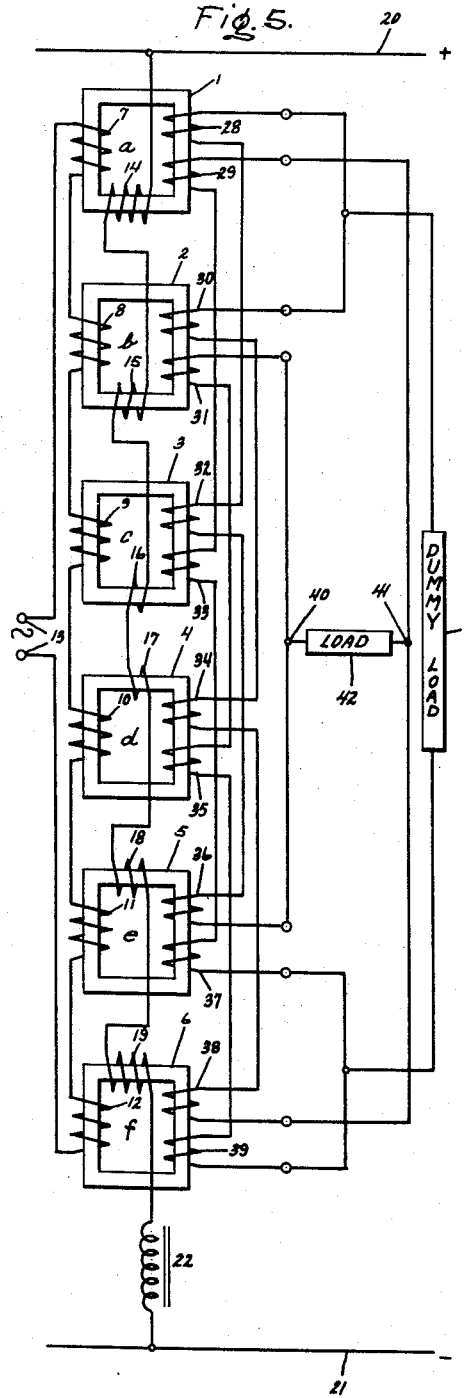
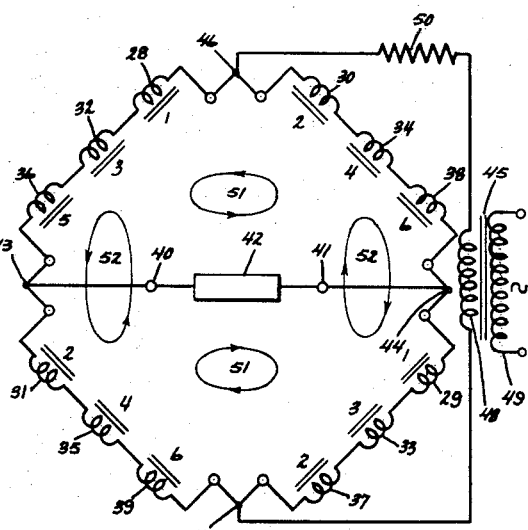
Inventor:
Hugh M. Ogle,
by *[signature]*
His Attorney.

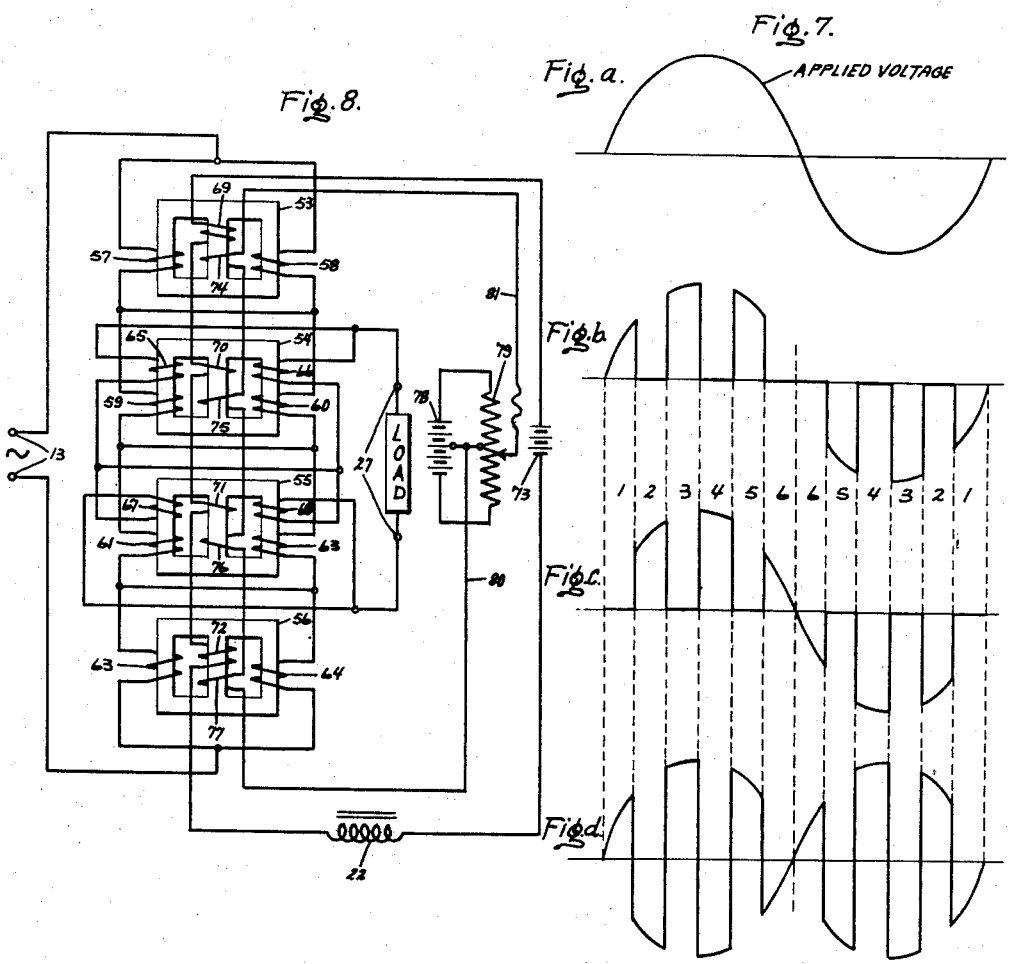

United States Patent Office 2,913,596
Patented Nov. 17, 1959

2,913,596

MAGNETIC FREQUENCY CONVERTER

Hugh M. Ogle, Palo Alto, Calif., assignor to General Electric Company, a corporation of New York Application August 5, 1957, Serial No. 676,076

14 Claims. (Cl. 307—88)

This invention relates to devices for converting alternating current of a given frequency to a higher frequency and more particularly to a frequency converter of the type employing static magnetic components.

There are many instances, for example, in the operation of an induction heating equipment, magnetic amplifiers and alternating current induction motors where it is desirable to employ alternating current at frequencies considerably higher than the frequency generally supplied by utilities, i.e., 60 cycles per second. This higher frequency power may be supplied by rotating equipment such as a 60 cycle alternating current motor driving a higher frequency alternator, however, rotating equipment inherently requires appreciable maintenance and may be relatively large and bulky and it is therefore desirable to provide such higher frequency with static equipment.

Static magnetic frequency converters utilizing various combinations of saturable core reactors and transformers have been proposed in the past. Many of these devices have required a source of three-phase alternating current power, many have involved complex circuitry with a large number of reactors, particularly where an output frequency considerably higher than the input frequency is desired, and all with which the applicant is familiar have had their output frequency locked to the input frequency, i.e., the output frequency could not be varied.

It is therefore desirable to provide a frequency converter utilizing static magnetic devices which operates from a single phase source of alternating current power and which embodies simple circuitry with a minimum number of components. It is further desirable that such a device be capable of providing a variable frequency output.

It is therefore an object of this invention to provide an improved static magnetic frequency converter operable from a single phase source of alternating current.

Another object of this invention is to provide an improved static magnetic frequency converter embodying simpler circuitry and a smaller number of components than has heretofore been provided.

Yet another object of this invention is to provide an improved static magnetic frequency converter having a variable frequency output.

Further objects and advantages of this invention will become apparent by reference to the following description in the accompanying drawings, and the features of novelty which characterize this invention will be pointed out with particularity in the claims annexed to and forming a part of this specification.

In its broader aspects, this invention provides an even number of sharply saturable cores in excess of two with each of the cores having an alternating current winding thereon, the alternating current windings being serially connected across a source of single phase alternating current. Each of the cores has a different predetermined bias, the bias being arranged so that all of the cores except one are saturated at any given instant, thus causing the cores to be sequentially switched out of and into saturation during a cycle of applied alternating current voltage. An even number of output windings is provided for at least all except two of the cores, these windings forming transformers with their respective alternating current windings. Voltage pulses are induced in the output windings in response to their respective cores going out of and into saturation and by appropriate connection of the output windings, these pulses appear as a train of positive and negative pulses in the output circuit.

In the drawings,

Fig. 1 is a schematic illustration of the preferred embodiment of this invention;

Figure 2 shows the output voltage pulses during a cycle of applied alternating current voltage;

Figure 3 shows the variation in magnetizing current of the circuit of Fig. 1 during the cycle of operation of Fig. 2;

Fig. 4 shows the saturation condition of the cores of the device of Fig. 1 during the cycle of operation of Figs. 2 and 3;

Fig. 5 is a schematic illustration of another embodiment of this invention;

Fig. 6 is a further schematic illustration of the embodiment of Fig. 5;

Figs. 7a through d, inclusive, show the output voltage pulses and the combination thereof during a cycle of applied alternating current voltage; and Fig. 8 is another schematic illustration showing a modification of the embodiment of Fig. 1.

Referring now to Fig. 1 of the drawings, my improved frequency converter is shown as having six magnetic cores 1 through 6 inclusive, each formed of sharply saturable magnetic material having a substantially square dynamic hysteresis loop. The cores 1 through 6 are provided with alternating current windings 7 through 12 respectively, the alternating current windings being connected in series across input terminals 13 which are adapted to be connected to an external source of single phase alternating current (not shown), such as 60 cycles per second.

Cores 1 through 6 inclusive are respectively provided with direct current bias windings 14 through 19 inclusive, connected in series across a source of direct current bias voltage 20 and 21. A choke 22 is serially connected with the bias windings 14 through 19 in order to filter alternating current voltages induced in the bias windings by transformer action from the alternating current windings 7 through 12 inclusive. The bias windings 14 through 19 inclusive are arranged to provide a different predetermined bias M.M.F. for each of the cores 1 through 6 inclusive; in the illustrated embodiment bias windings 14, 15 and 16 are shown as having progressively fewer turns and providing bias M.M.F. of one polarity while bias windings 17, 18 and 19 have progressively increasing turns and providing bias M.M.F. of the opposite polarity. The bias windings 14 through 19 are arranged to provide sufficient ampere turns so that all except one of the cores 1 through 6 inclusive will be saturated at any instant and thus, as will become more apparent hereinafter, the cores 1 through 6 are sequentially switched out of and into saturation during a complete cycle of applied alternating current voltage.

Output windings 23 through 26 inclusive, are provided on the four intermediate cores 2 through 5 inclusive, with the windings 24 and 26 being connected in the opposite sense from their adjacent windings 23 and 25 respectively. The output windings 23 to 26 inclusive are connected in series across output terminals 27. It will now be seen that as cores 2, 3, 4, and 5 go out of and thereafter into saturation, voltage pulses will be respectively and sequentially induced in output windings 23, 24, 25 and 26 by transformer action from alternating current windings 8, 9, 10, and 11 and by virtue of the connection in the reverse sense of output windings 24 and 26, these pulses will appear as positive and negative pulses across the output terminals 27.

Referring now to Figs. 2, 3, and 4, it will be seen that since core 1 has no output winding, no voltage will be provided across the output terminals 27 while core 1 is unsaturated and thus, as shown in Fig. 2, there will be no output voltage during the first interval of the cycle of applied voltage. It will be recalled that while core 1 is unsaturated, the remaining cores 2 through 6 are saturated and thus no voltages will be induced in the output windings 23 through 26. During the second interval of a cycle of applied voltage when core 2 goes out of and subsequently back into saturation, a pulse of voltage will be induced in output winding 23 by transformer action from alternating current winding 8, as shown in Fig. 2. Likewise, during the third interval, a pulse of voltage is induced in output winding 24 which by virtue of its connection in the reverse sense from winding 23 appears as a negative pulse with respect to the pulse induced during interval 2. During the fourth interval, a positive pulse is induced in output winding 25 and during the fifth interval, a negative pulse is induced in output winding 26. During the sixth and last interval, when core 6 goes out of saturation, no output voltage is provided by virtue of the fact that no output winding is provided on the core 6. It is thus seen, by reference to Fig. 2, that during each half cycle of applied voltage, a burst of pulses is provided across the output terminals having, in the illustrated embodiment, four cycles being produced for each cycle of the applied frequency, the successive bursts during each half cycle being spaced apart by coasting intervals provided by virtue of the fact that no output windings are arranged on the end cores 1 and 6.

Referring now momentarily to Figs. 3 and 4, it has been assumed that core 1 is provided with three positive units of bias current, core 2 with two positive units and core 3 with one positive unit, while cores 4, 5, and 6 are respectively provided with one negative, two negative and three negative units of bias current. It will now be observed that the series circuit of the alternating current windings 7 through 12 is inductive in character and that therefore the current flowing in the alternating current windings will lag the applied voltage by substantially 90°. Thus, at the beginning of a positive half cycle of applied alternating current voltage, the current in the alternating current windings 7 through 12 will be maximum negative and beginning to decrease in the positive direction. Recalling that the cores are biased so that only one can be unsaturated at any given time, it will be seen that with maximum negative magnetizing current, and assuming three positive units of bias in core 1, that core will be unsaturated and the remaining cores 2 through 6 will be saturated in the negative direction since the magnetizing current will overcome the bias. At the end of the first interval of the positive half cycle of applied voltage, the magnetizing current will have decayed sufficiently that the bias on core 1 will overcome the magnetizing current and that core will go into saturation in the positive direction. At the same time, the magnetizing current will have decayed to the point where it is equal to the bias on core 2 permitting core 2 to go from saturation in the negative direction to its unsaturated condition. At the end of this second interval, core 2 will go into saturation in the positive direction under the influence of its bias and the magnetizing current will have decayed sufficiently again to permit core 3 to go from its saturated negative condition to the unsaturated condition. This sequence is continued throughout the positive and negative half cycles of applied voltage, the sequence of the cores 1 through 6 going from saturation to the unsaturated condition and back to the saturated condition being shown in Fig. 4 and the plot of magnetizing current which causes this sequentially switching action being shown in Fig. 3.

It will be readily understood that the width of the pulses of induced voltage as shown in Fig. 2 is determined by the volt second rating of the respective cores and thus the pulses may be narrowed or widened in response to raising or lowering respectively the applied voltage, the difference being absorbed by the coasting spaces provided by the end cores 1 and 6 which do not have output windings. It will now be seen that the output frequency depends on the spacing of the pulses and it will be readily understood if a continuous train of positive and negative pulses is desired in the output circuit, the coasting spaces may be filled in by a resonant circuit tuned to the apparent frequency of the output pulses. However, in applications such as induction heating electroluminescent lighting, the operation of magnetic amplifiers and the operation of induction motors, the successive bursts of pulses are adequate and no tuned circuit is necessary to fill in the coasting spaces. It will be seen that within each half cycle, the same number of pulses is provided, the number of pulses being determined by the number of cores having output windings. It will also be seen that the number of turns on the output windings 23 to 26 can be arranged to provide the desired output voltage and further that a uniform height of output voltage pulses may be provided by suitable adjustment of the turns of the output windings. It will also be apparent that in order to fill in between the bursts of output pulses with a resonant circuit, it is necessary that there be an integral number of full pulse cycles between the successive bursts.

It will readily be seen that load current flowing in the output windings 23 through 26 will tend to add or subtract from the bias and it is therefore important that the bias on the cores 1 through 6 be separated by an incremental amount equal to the load current in order to prevent overlapping. It will be seen that when the load current equals or exceeds the differential bias, one core will go out of saturation before its adjacent core has gone back into saturation and thus the frequency converting action will be destroyed. For this reason, the incremental bias-amp turns must be at least equal to the maximum load current amp turns provided by the output windings 23 through 26.

It will be readily apparent that, while six cores are shown in the illustrated embodiment of Fig. 1, a greater even number of cores, for example, eight may be provided or a smaller number, for example, four which is however a minimum since there must be two cores without load windings and two cores with load windings to provide positive and negative output pulses. It is thus seen that in the embodiment of Fig. 1, an even number of cores in excess of two are required with all except two of the cores being provided with output windings.

Referring now to Figs. 5 and 6, there is shown another embodiment of this invention, which requires less power from the direct current bias supply. In these figures, with like elements being indicated by like reference numerals. The sharply saturating cores 1 through 6 are again respectively provided with serially connected alternating current windings 7 through 12 inclusive, which are connected across alternating current input terminals 13. Cores 1 through 6 inclusive are also again provided with direct current bias windings 14 through 19 in the same manner as the cores of Fig. 1, the bias windings being serially connected with choke 22 across a source of direct current bias supply 20 and 21. The bias windings 14 through 19 are again arranged to provide a different predetermined bias for each of the cores, windings 14 through 16 providing bias of one polarity for their respective cores and windings 17 through 19 providing bias of the opposite polarities, In the embodiment of Figs. 5 and 6, each of the cores 1 through 6 is provided with a pair of output windings 28 and 29, 30 and 31, 32 and 33, 34 and 35, 36 and 37, and 38 and 39 respectively. In this circuit, the first output windings 28, 32 and 36 of one group of alternate cores are serially connected to form a first series circuit, the second output windings 29, 33 and 37 of the same group of alternate cores 1, 3 and 5 are likewise serially connected to form a second series circuit, the first output windings 30, 34 and 38 of the remaining group of alternate cores 2, 4, and 6 are serially connected to form a third series circuit and the second output windings 31, 35 and 39 of the remaining group of alternate cores 2, 4, and 6 are likewise serially connected to form a fourth series circuit. A pair of load terminals 40 and 41 are provided, adapted to have load 42 connected thereacross and the output winding circuits are connected to form a bridge circuit with a series circuit of output windings 28, 32, and 36 and the series circuit of output windings 29 and 32, 37 forming two opposite legs of the bridge and the series circuits of windings 30, 34 and 38, and 31, 35 and 39 respectively forming the remaining two opposite legs of the bridge. It will be seen that load terminals 40 and 41 are connected to opposite corners 43 and 44 of the bridge, corner 43 being between the series circuit of windings 28, 32, and 36 on one group of cores 31, 35 and 39 on the other group of cores while the corner 44 is likewise between the remaining windings 30, 34 and 38 on one group of cores and 29, 33 and 37 on the other group of cores.

Reference to Figs. 7a through 7d will now illustrate the mode of operation of the circuit of Figs. 5 and 6. As in the case of the circuit of Fig. 1, the cores 1 through 6 are progressively switched out of and into saturation during a cycle of applied voltage with the bias being arranged so that only one core may be saturated at any instant. It will now be seen that during the first interval of a positive half cycle of applied voltage, and with reference back to Fig. 4, core 1 will be unsaturated and therefore positive pulses of output voltage will be induced in windings 28 and 29 shown in Fig. 7b, which shows the pulses induced in the windings connected to the first group of cores. No pulse is induced in any of the output windings on the second group of alternate cores as shown in Fig. 7c since all of these cores are saturated in the first interval. During the second interval of a positive half cycle of applied voltage, core 2 has become unsaturated and thus positive voltage pulses is induced in output windings 30 and 31 of the remaining group of alternate cores as shown in Fig. 7c. As shown in Figs. 7b and 7c, during the remaining intervals of a positive and negative half cycle of applied alternating current voltage, impulses of output voltage will be sequentially induced in the output windings on the first alternate group of cores and then in the output windings of the second group of cores. The bridge connection of the load 42 provides for subtractive combination of the voltage impulses in the output windings on the two groups of alternate cores as shown in Figs. 7b and 7c so that the resultant voltage appearing across load terminals 40 and 41 is that shown in 7d; the pulse appearing on windings 28 and 29 during interval 1 remains a positive pulse, the pulse appearing on windings 30 and 31 is now the next negative pulse, etc.

It will be seen that with the circuit of Figs. 5 and 6, there is no coasting interval between the first pulses and therefore the output frequency is in this case locked to the input frequency. Coasting intervals may, however, be provided thereby to provide variable output frequency by adding a pair of reactors at either end of the reactors 1 through 6 which are not provided with an output winding in the manner of the circuit of Fig. 1.

In order to reduce the power required to be supplied from the bias supply 20 and 21 of Figs. 5 and 6, a dummy load 45 may be connected across the other two opposite corners 46 and 47 of the bridge connected output windings. This dummy load may be a transformer as shown in Fig. 6 with its primary winding 48 connected across the corners 46 and 47 of the bridge and its secondary winding 49 may be connected across the single phase supply line which is connected to input terminals 13 in order to pump the power in the dummy load circuit back into the supply circuit. It will be readily apparent that whereas the bridge connection of the load 42 across opposite corners 43 and 44 subtractively combines the voltage impulses in the opposite legs of the bridge, the connection of the dummy load 45 across the corners 46 and 47 additively combines the impulses of Figs. 7b and 7c thereby forming a voltage wave corresponding to the applied voltage, the transformer serving merely to provide the proper output voltage for matching with the supply voltage; the transformer may be eliminated and the dummy load directly connected to the supply lines if the voltage is correct. The current limiting resistor 50 is also preferably connected in series with the primary winding 48 of the dummy load 45.

It will readily be apparent that if load current flows in the bridge circuit of Figure 6 in the direction shown by the arrows 51, current will flow in the dummy load circuit in the direction shown by the arrows 52. It is thus seen that the dummy load current bucks the load current in the branches composed of windings 30, 34 and 38 and 31, and 35 and 39 while aiding the load current in the branches composed of windings 28, 32 and 26 and 29, 33 and 37. In the basic circuit of Fig. 1, the active core, i.e., the one which is unsaturated, is electrically adjacent two inactive cores, i.e., saturated cores, and thus it is seen that if the effect of the load current flowing in the respective output winding causes the active reactor to go back into saturation before the next adjacent core has been caused to go out of saturation, the desired output voltage pulse will not be secured. The overlapping tendency caused by load current must be overcome by increased bias separation, i.e., a greater incremental bias ampere turns level which correspondingly requires increased bias current. In the circuit of Figs. 5 and 6, assuming for the moment that core 3 with windings 32 and 33 is the active reactor, core 4 with windings 34 and 35 is the next core to go out of saturation. It is immediately seen that in the bridge circuit, the dummy load current bucks the load current in windings 34 and 35 so that there is no tendency for core 4 to be driven out of saturation prematurely and while the dummy load current aids the real load current in windings 32 and 33. These windings are removed by one core from the adjacent windings 28 and 36, and 29 and 37 respectively, these windings further being all of the same polarity, and if the combined effect of the load current and dummy load current does cause an additional reactor in that leg to become unsaturated, the effect is merely of having two active windings in series and not to buck out the active winding as in the case of the simple circuit of Fig. 1. It is therefore seen that with the bridge circuit of Figs. 5 and 6, more load current can be passed without causing overlapping than can be passed with the circuit of Fig. 1 with the same bias current. In this case, it will probably be found desirable not to have the dummy load current completely buck out the load current in the inactive legs but rather to have it buck out approximately half of the load current.

Referring now to Fig. 8 in which like elements are again indicated by like reference numerals, it will be recalled that with the circuit of Fig. 1, the apparent output frequency can be varied by varying the applied voltage. This apparent output frequency can also be varied by providing a selectively variable control M.M.F. for each of the cores. In Fig. 8 is shown a circuit similar to that of Fig. 1 however with only four cores being shown. Here the cores 53, 54 and 55 and 56 are shown as being of the three-legged variety with parallel connected alternating current windings 57 and 58, 59 and 60, 61 and 62, and 63 and 64 being respectively provided on the outside legs, the parallel connected alternating current windings 57 through 64 being serially connected across the alternating current input terminals 13. Parallel connected output windings 65 and 66 and 67 and 68 are likewise respectively provided on the outside legs of cores 54 and 55, output windings 67 and 68 being connected in the reverse from output windings 65 and 66. The output windings are serially connected across load terminal 27. Bias windings 69, 70, 71 and 72 are arranged on the center legs of cores 53 through 56 and are again arranged to provide the different bias M.M.F. level for each of the respective cores. The bias windings 69 through 72 are serially connected across a suitable source of direct current bias voltage such as battery 73. Here again it will be noted that bias windings 69 and 70 have progressively fewer turns and are arranged to provide bias M.M.F. of a given polarity whereas bias windings 71 and 72 are arranged with progressively greater turns and to provide the bias M.M.F. of the opposite polarity.

In order to provide for change in the output frequency, i.e., widening or narrowing of the output pulses within a half cycle of applied voltage, direct current control windings 74, 75, 76, and 77 are respectively arranged on the center legs of cores 53 through 56 and are connected in series for energization by a suitable source of direct current such as battery 78. Here, a potentiometer 79 is connected across battery 78 with one side 80 of the control winding circuit being connected to a midpoint on the battery and the other side 81 being connected to the sliding contact of potentiometer 79 thereby to provide for impressing a selectively variable voltage of either polarity on the serially connected direct current control windings 74 through 77.

As in the case of increasing the applied voltage across input terminals 13, increasing the control M.M.F. will narrow the voltage output impulses appearing across input terminals 27 and thus increase the apparent output frequency and conversely, lowering the control current will widen the voltage output impulses in any given half cycle and thus lower the apparent output frequency.

It will now be readily apparent that I have provided an improved frequency converting arrangement which is operable from a source of single phase alternating current power and which utilizes simple circuitry with a minimum number of components for a given output frequency and which will further provide an essentially variable frequency output if desired by the mere addition of two cores which do not have output windings.

While I have illustrated and described specific embodiments of this invention, further modifications and improvements will occur to those skilled in the art. I desire that it be understood therefore that this invention is not limited to these particular forms shown and I intend in the appended claims to cover all modifications which do not depart from the spirit and scope of this invention.

What I claim as new and desire to secure by Letters Patent of the United States is:

1. A static magnetic frequency converter comprising: an even number of sharply saturable cores in excess of two; each of said cores having an alternating current winding thereon, said alternating current windings being connected in a series circuit; a pair of alternating current input terminals adapted to be connected to a single phase source of alternating current, said series circuit being connected across said input terminals; means respectively providing a different predetermined unidirectional bias M.M.F. for each of said cores, said means being arranged to saturate all except one of said cores at any instant so that said cores are sequentially switched out of and into saturation during a cycle of alternating current voltage applied to said alternating current windings; an even number and at least all except two of said cores having output windings thereon thereby forming transformers with the respective alternating current windings so that voltage pulses are induced in said output windings as the respective cores go out of and into saturation; and a pair of load terminals, said output windings being connected in circuit with said load terminals so that said voltage pulses induced in said output windings provide an alternating current voltage across said load terminals.

2. A static magnetic frequency converter comprising: an even number of sharply saturable cores in excess of two; each of said cores having an alternating current winding thereon, said alternating current windings being connected in a series circuit; a pair of alternating current input terminals adapted to be connected to a single phase source of alternating current, said series circuit being connected across said input terminals; each of said cores having a direct current bias winding with circuit connections for impressing a predetermined direct current voltage thereon, said bias windings being respectively arranged to provide a different predetermined bias M.M.F. for each of said cores, said bias windings being further arranged to saturate all except one of said cores at any instant so that said cores are sequentially switched out of and into saturation during a cycle of alternating current voltage applied to said alternating current windings; an even number and at least all except two of said cores having output windings thereon thereby forming transformers with the respective alternating current windings so that voltage pulses are induced in said output windings as the respective cores go out of and into saturation; and a pair of load terminals, said output windings being connected in circuit with said load terminals so that said voltage pulses induced in said output windings provide an alternating current voltage across said load terminals.

3. A static magnetic frequency converter comprising: an even number of sharply saturable cores in excess of two; each of said cores having an alternating current winding thereon, said alternating current windings being connected in a series circuit; a pair of alternating current input terminals adapted to be connected to a single phase source of alternating current, said series circuit being connected across said input terminals; each of said cores having a direct current bias winding with circuit connections for impressing a predetermined direct current voltage thereon, half of said bias windings being respectively arranged to provide a different predetermined bias M.M.F. in one direction for the respective cores, the other half of said bias windings being respectively arranged to provide a different predetermined bias M.M.F. in the opposite direction for the respective cores, said bias windings being arranged to saturate all except one of said cores at any instant so that said cores are sequentially switched out of and into saturation during a cycle of alternating current voltage applied to said alternating current windings; an even number and at least all except two of said cores having output windings thereon thereby forming transformers with the respective alternating current windings so that voltage pulses are induced in said output windings as the respective cores go out of and into saturation; and a pair of load terminals, said output windings being connected in circuit with said load terminals so that voltage pulses induced in said output windings provide an alternating current voltage across said load terminals.

4. A static magnetic frequency converter comprising: an even number of sharply saturable cores in excess of two; each of said cores having an alternating current winding thereon, said alternating current windings being connected in a series circuit; a pair of alternating current input terminals adapted to be connected to a single phase source of alternating current, said series circuit being connected across said input terminals; means respectively providing a different predetermined unidirectional bias M.M.F. for each of said cores, said means being arranged to saturate all except one of said cores at any instant so that said cores are sequentially switched out of and into saturation during a cycle of alternating current voltage applied to said alternating current windings; all except two of said cores having output windings thereon thereby forming transformers with the respective alternating current windings so that voltage pulses are induced in said output windings as the respective cores go out of and into saturation; and a pair of load terminals, said output windings being connected in circuit with said load terminals so that said voltage pulses induced in said output windings provide an alternating current voltage across said load terminals.

5. A static magnetic frequency converter comprising: an even number of sharply saturable cores in excess of two; each of said cores having an alternating current winding thereon, said alternating current windings being connected in a series circuit; a pair of alternating current input terminals adapted to be connected to a single phase source of alternating current, said series circuit being connected across said input terminals; means respectively providing a different predetermined unidirectional bias M.M.F. for each of said cores, said means being arranged to saturate all except one of said cores at any instant so that said cores are sequentially switched out of and into saturation during a cycle of alternating current voltage applied to said alternating current windings; all except two of said cores having output windings thereon thereby forming transformers with the respective alternating current windings so that voltage pulses are induced in said output windings as the respective cores go out of and into saturation; and a pair of load terminals, said output windings being serially connected across said load current terminals with half of said output windings being connected in one sense and the other half in the opposite sense so that said voltage impulses induced therein provide an alternating current voltage across said load terminals.

6. A static magnetic frequency converter comprising: an even number of sharply saturable cores in excess of two; each of said cores having an alternating current winding thereon, said alternating current windings being connected in a series circuit; a pair of alternating current input terminals adapted to be connected to a single phase source of alternating current, said series circuit being connected across said input terminals; each of said cores having a direct current bias winding with circuit connections for impressing upon a predetermined direct current voltage thereon; a first group of half of said cores having their bias windings respectively arranged to provide a different predetermined bias M.M.F. in one direction for the respective cores and the second group of the other half of said cores having their bias windings respectively arranged to provide a different predetermined bias M.M.F. in the opposite direction for the respective cores, said bias windings being arranged to saturate all except one of said cores at any instant so that said cores are sequentially switched out of and into saturation during a cycle of alternating current voltage applied to said alternating current windings; all except one of said cores in each of said groups having output windings thereon thereby forming transformers with their respective alternating current windings so that voltage pulses are induced in said output windings as the respective cores go out of and into saturation; and a pair of load terminals, said output windings being serially connected across said load terminals with the output windings on adjacent cores being connected in opposite senses so that the voltage pulses induced therein provide an alternating current voltage across said load terminals.

7. A static magnetic frequency converter comprising: an even number of sharply saturable cores in excess of two; each of said cores having an alternating current winding thereon, said alternating current windings connected in a series circuit; a pair of alternating current input terminals adapted to be connected to a single phase source of alternating current, said series circuit being connected across said input terminals; means respectively providing a different predetermined unidirectional bias M.M.F. for each of said cores, said means being arranged to saturate all except one of said cores at any instant so that said cores are sequentially switched out of and into saturation during a cycle of alternating current voltage applied to said alternating current windings; each of said cores having first and second and output windings thereon whereby voltage pulses are induced in each of said output windings as the respective cores go out of and into saturation, said first output winding of one group of alternate cores being connected to form a first series circuit, said second output windings of said first group of alternate cores being connected to form a second series circuit, said first output windings of the remaining group of alternate cores being connected to form a third series circuit, said second output windings of said remaining group of alternate cores being connected to form a fourth series circuit; and a pair of load terminals; said output winding circuits being connected to form a bridge circuit with said first and second series circuits forming two opposite legs and said third and fourth series circuit forming the other two opposite legs thereof, a pair of opposite corners of said bridge circuit being connected to said load terminals so that the voltage pulses induced in said output windings on said first group of alternate cores are subtracted from the voltage pulses induced in the output windings on said remaining group of alternate cores.

8. A static magnetic frequency converter comprising: an even number of sharply saturable cores in excess of two; each of said cores having an alternating current winding thereon, said alternating current windings being connected in a series circuit; a pair of alternating current input terminals adapted to be connected to a single phase source of alternating current, said series circuit being connected across said input terminals; each of said cores having a direct current bias winding with circuit connections for impressing a predetermined direct current voltage thereon, half of said bias windings being respectively arranged to provide a different predetermined bias M.M.F. in one direction for the respective cores, the other half of said bias windings being respectively arranged to provide a different predetermined bias M.M.F. in the opposite direction for the respective cores, said bias windings being arranged to saturate all except one of said cores at any instant so that said cores are sequentially switched out of and into saturation during a cycle of alternating current voltage applied to said alternating current windings, each of said cores having first and second output windings thereon whereby voltage pulses are induced in each of said output windings as the respective cores go out of and into saturation, said first output windings of one group of alternate cores being connected to form a first series circuit, said second output windings of said first group of alternate cores being connected to form a second series circuit, said first output windings of the remaining group of alternate cores being connected to form a third series circuit, said second output windings of said remaining group of alternate cores being connected to form a fourth series circuit; and a pair of load terminals; said output winding circuits being connected to form a bridge circuit with said first and second series circuits forming two opposite legs and said third and fourth series circuit forming the other two opposite legs thereof, a pair of opposite corners of said bridge circuit being connected to said load terminals so that the voltage pulses induced in said output windings on said first group of alternate cores are subtracted from the voltage pulses induced in the output windings on said remaining group of alternate cores.

9. A static magnetic frequency converter comprising: an even number of sharply saturable cores in excess of two; each of said cores having an alternating current winding thereon, said alternating current windings being connected in a series circuit; a pair of alternating current input terminals adapted to be connected to a single phase source of alternating current, said series circuit being connected across said input terminals; each of said cores having a direct current bias winding with circuit connections for impressing a predetermined direct current voltage thereon, half of said bias windings being respectively arranged to provide a different predetermined bias M.M.F. in one direction for the respective cores, the other half of said bias windings being respectively arranged to provide a different predetermined bias M.M.F. in the opposite direction for the respective cores, said bias windings being arranged to saturate all except one of said cores at any instant so that said cores are sequentially switched out of and into saturation during a cycle of alternating current voltage applied to said alternating current windings, each of said cores having first and second output windings thereon whereby voltage pulses are induced in each of said output windings as the respective cores go out of and into saturation, said first output windings of one group of alternate cores being connected to form a first series circuit, said second output windings of said first group of alternate cores being connected to form a second series circuit, said first output windings of the remaining group of alternate cores being connected to form a third series circuit, said second output windings of said remaining group of alternate cores being connected to form a fourth series circuit; a pair of load terminals; said output winding circuits being connected to form a bridge circuit with said first and second series circuits forming two opposite legs and said third and fourth series circuits forming the other two opposite legs thereof, a pair of opposite corners of said bridge circuit being connected to said load terminals so that the voltage pulses induced in said output windings on said first group of alternate cores are subtracted from the voltage pulses induced in the output windings on said remaining group of alternate cores; and a dummy load circuit connected across the other pair of opposite corners of said bridge circuit for reducing the power required for energizing said bias windings.

10. A static magnetic frequency converter comprising: an even number of sharply saturable cores in excess of two; each of said cores having an alternating current winding thereon, said alternating current windings being connected in a series circuit; a pair of alternating current input terminals adapted to be connected to a single phase source of alternating current, said series circuit being connected across said input terminals; each of said cores having a direct current bias winding with circuit connections for impressing a predetermined direct current voltage thereon, half of said bias windings being respectively arranged to provide a different predetermined bias M.M.F. in one direction for the respective cores, the other half of said bias windings being respectively arranged to provide a different predetermined bias M.M.F. in the opposite direction for the respective cores, said bias windings being arranged to saturate all except one of said cores at any instant so that said cores are sequentially switched out of and into saturation during a cycle of alternating current voltage applied to said alternating current windings, each of said cores having first and second output windings thereon whereby voltage pulses are induced in each of said output windings as the respective cores go out of and into saturation, said first output windings of one group of alternate cores being connected to form a first series circuit, said second output windings of said first group of alternate cores being connected to form a second series circuit, said first output windings of the remaining group of alternate cores being connected to form a third series circuit, said second output windings of said remaining group of alternate cores being connected to form a fourth series circuit, a pair of load terminals; said output winding circuits being connected to form a bridge circuit with said first and second series circuits forming two opposite legs and said third and fourth series circuits forming the other two opposite legs thereof, a pair of opposite corners of said bridge circuit being connected to said load terminals so that the voltage pulses induced in said output windings of said first group of alternate cores are subtracted from the voltage pulses induced in the output windings on said remaining group of alternate cores; and a transformer having its primary winding connected across the other opposite corners of said bridge circuit and having its secondary connected across said alternating current input terminals thereby forming a dummy load circuit for reducing the power required for energizing said bias windings.

11. A static magnetic frequency converter comprising: an even number of sharply saturable cores in excess of two; each of said cores having an alternating current winding thereon, said alternating current windings being connected in a series circuit; a pair of alternating current input terminals adapted to be connected to a single phase source of alternating current, said series circuit being connected across said input terminals; means respectively providing a different predetermined unidirectional bias M.M.F. for each of said cores, said means being arranged to saturate all except one of said cores at any instant so that said cores are sequentially switched out of and into saturation during a cycle of alternating current voltage applied to said alternating current windings; means respectively providing a selectively variable unidirectional control M.M.F. for all of said cores; an even number and at least all except two of said cores having output windings thereon thereby forming transformers with the respective alternating current windings so that voltage pulses are induced in said output windings as the respective cores go out of and into saturation; and a pair of load terminals, said output windings being connected in circuit with said load terminals so that said voltage pulses induced in said output windings provide an alternating current voltage across said load terminals.

12. A static magnetic frequency converter comprising: an even number of sharply saturable cores in excess of two; each of said cores having an alternating current winding thereon, said alternating current windings being connected in a series circuit; a pair of alternating current input terminals adapted to be connected to a single phase source of alternating current, said series circuit being connected across said input terminals; each of said cores having a direct current bias winding with circuit connections for impressing a predetermined direct current voltage thereon, half of said bias windings being respectively arranged to provide a different predetermined bias M.M.F. in one direction for the respective cores, the other half of said bias windings being respectively arranged to provide a different predetermined bias M.M.F. in the opposite direction for the respective cores, said bias windings being arranged to saturate all except one of said cores at any instant so that said cores are sequentially switched out of and into saturation during a cycle of alternating current voltage applied to said alternating current windings, each of said cores having a direct current control winding thereon, said control windings being serially connected; circuit connections for impressing a selectively variable direct current voltage on said serially connected control windings; an even number and at least all except two of said cores having output windings thereon thereby forming transformers with the respective alternating current windings so that voltage pulses are induced in said output windings as the respective cores go out of and into saturation; and a pair of load terminals, said output windings being connected in circuit with said load terminals so that the voltage pulses induced in said output windings provide an alternating current voltage across said load terminals.

13. A static magnetic frequency converter comprising:

an even number of sharply saturable cores in excess of two; each of said cores having an alternating current winding thereon, said alternating current windings being connected in a series circuit; a pair of alternating current input terminals adapted to be connected to a single phase source of alternating current, said series circuit being connected across said input terminals; means respectively providing a different predetermined unidirectional bias M.M.F. for each of said cores, said means being arranged to saturate all except one of said cores at any instant so that said cores are sequentially switched out of and into saturation during a cycle of alternating current voltage applied to said alternating current windings; means respectively providing a selectively variable unidirectional control M.M.F. for all of said cores; all except two of said cores having output windings thereon thereby forming transformers with the respective alternating current windings so that voltage pulses are induced in said output windings as the respective cores go out of and into saturation; and a pair of load terminals, said output windings being connected in circuit with said load terminals so that said voltage pulses induced in said output windings provide an alternating current voltage across said load terminals.

14. A static magnetic frequency converter comprising: an even number of sharply saturable cores in excess of two; each of said cores having an alternating current winding thereon, said alternating current windings being connected in a series circuit; a pair of alternating current input terminals adapted to be connected to a single phase source of alternating current, said series circuit being connected across said input terminals; each of said cores having a direct current bias winding with circuit connections for impressing a predetermined direct current voltage thereon; a first group of half of said cores having their bias windings respectively arranged to provide a different predetermined bias M.M.F. in one direction for respective cores and the second group of the other half of said cores having their bias windings respectively arranged to provide a different predetermined bias M.M.F. in the opposite direction for the respective cores, said bias windings being arranged to saturate all except one of said cores in any instant so that said cores are sequentially switched out of and into saturation during a cycle of alternating current voltage applied to said alternating current windings; each of said cores having a direct current control winding thereon, said control windings being serially connected; circuit connections for impressing a selectively variable direct current voltage on said serially connected control windings; all except one of said cores in each of said groups having output windings thereon thereby forming transformers with their respective alternating current windings so that voltage pulses are induced in said output windings as the respective cores go out of and into saturation; and a pair of load terminals, said output windings being serially connected across load terminals with the output windings on adjacent cores being connected in opposite senses so that the voltage pulses induced therein provide an alternating current voltage across said load terminals.

References Cited in the file of this patent

UNITED STATES PATENTS

| | | |
|---|---|---|
| 1,877,703 | Suits | Sept. 13, 1932 |
| 2,418,640 | Huge | Apr. 8, 1947 |
| 2,666,178 | Kramer | Jan. 12, 1954 |
| 2,814,737 | Sunderlin et al. | Nov. 26, 1957 |